United States Patent
Quayle et al.

(10) Patent No.: US 11,610,040 B1
(45) Date of Patent: Mar. 21, 2023

(54) SYSTEM INTERCONNECT ARCHITECTURE USING DYNAMIC BITWISE SWITCH AND LOW-LATENCY INPUT/OUTPUT

(71) Applicant: CADENCE DESIGN SYSTEMS, INC., San Jose, CA (US)

(72) Inventors: Barton Quayle, San Jose, CA (US); Mitchell G. Poplack, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 694 days.

(21) Appl. No.: 16/209,597

(22) Filed: Dec. 4, 2018

(51) Int. Cl.
*G06F 30/30* (2020.01)
*G06F 30/331* (2020.01)
*G06F 30/34* (2020.01)
*G06F 30/333* (2020.01)

(52) U.S. Cl.
CPC .......... *G06F 30/331* (2020.01); *G06F 30/34* (2020.01); *G06F 30/333* (2020.01)

(58) Field of Classification Search
CPC ....... G06F 30/331; G06F 30/34; G06F 30/333
See application file for complete search history.

(56) References Cited

U.S. PATENT DOCUMENTS

| | | | | |
|---|---|---|---|---|
| 5,566,171 A | * | 10/1996 | Levinson | H04L 49/351 370/352 |
| 8,255,853 B2 | * | 8/2012 | Wang | G06F 30/331 716/116 |
| 8,959,010 B1 | * | 2/2015 | Bershteyn | G06F 30/331 703/28 |
| 9,684,755 B2 | * | 6/2017 | Larzul | G06F 30/39 |
| 2002/0181215 A1 | * | 12/2002 | Guenthner | H05K 7/1445 361/784 |

* cited by examiner

*Primary Examiner* — Jack Chiang
*Assistant Examiner* — Brandon Bowers
(74) *Attorney, Agent, or Firm* — Foley & Lardner LLP

(57) ABSTRACT

Embodiments disclosed herein describe switching logic in board-level interconnects and in the system-level interconnects that may provide bitwise dynamic routing and switching between corresponding board-level and system-level components. At board-level, a switching ASIC may receive input data through a backplane from an emulation ASIC in a first logic board and route any bit of the input data to any of the emulation ASIC in a second logic board. At system-level, a switching logic board containing a set of switching ASICs may be associated with a logic cluster and may dynamically route data bits from the emulation ASICs in the logic cluster to emulation ASICs to other logic clusters of the emulation system and/or target systems. Additionally, the switching logic board may dynamically route bits from the other logic clusters to the associated logic cluster.

19 Claims, 10 Drawing Sheets

100

500

700

SYSTEM INTERCONNECT ARCHITECTURE USING DYNAMIC BITWISE SWITCH AND LOW-LATENCY INPUT/OUTPUT

CROSS REFERENCE TO RELATED APPLICATIONS

This application is related to application Ser. No. 16/208,447, filed Dec. 3, 2018, which is hereby incorporated by reference in its entirety.

TECHNICAL FIELD

This application is generally directed towards switching logic in interconnects of an emulation system and more specifically dynamic bitwise switching in logic board-level interconnects and system-level interconnects in an emulation system.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based Electronic Design Automation (EDA) tools for synthesis, debugging, and functional verification of the ICs. A significant function of EDA tools is emulation of a user's logical system (e.g., an IC design) to perform pre-silicon functional verification, firmware and software development, and post-silicon debug. To achieve this, a typical emulation system comprises several Application Specific Integrated Circuits (ASICs), often referred to as emulation ASICs, Field-Programmable Gate Arrays (FPGAs), or emulation chips, all working together to execute a program generated by an emulation compiler generated from the user's IC design. The compiled program models a design under test (DUT) that is a logical representation of the user's IC design running on the several emulation ASICs of the emulation system.

The emulation ASICs may be organized at various levels of hierarchy. For example, a logic board (also referred to as logic drawer) may contain several ASICs. Several logic boards may form a logic cluster and several logic clusters may form a server rack. In addition to running its own instructions, each emulation ASIC may communicate with other emulation ASICs in other logic boards, in other clusters, and/or other server racks. As different ASICs are modelling/running different interconnected portions of the DUT, the transmission of data between different ASICs is an important function within the emulation system.

Conventional emulation systems have fixed interconnects between their components. The fixed interconnects are inefficient because some components may require multiple hops to communicate with each other whereas other components may have unnecessary fat connections between them. For example, in a conventional emulation system, due to backplane limitation, each emulation ASIC within in a logic board within a logic cluster is connected to only half of the emulation ASICs in the other logic boards of the logic cluster. A communication between the unconnected emulation ASICs therefore requires extra hops through the connected emulation ASICs. Another conventional emulation system may have a cable connecting an emulation ASIC 1(i) of a first logic board to an emulation ASIC 2(i) of a second logic board. The cable therefore may form a dedicated fat connection between the ASICs 1(i) and 2(i) and the connection may be seldom used for emulating a DUT. Each connection in an emulation system is valuable resource and an inefficient utilization of a valuable resource is not desirable.

Within the system-level connections, a conventional emulation system may have to hop through several emulation ASICs to reach from a source emulation ASIC to a target emulation ASIC across different emulation racks. Utilization of emulation ASICs for just for hopping wastes valuable input/output resources of the several emulation ASICs that have been hopped through. For example, the input/output pins in the emulation ASICs used for hopping could have been used outputting data generated by the emulation ASICs and/or inputting data to be processed by the emulation ASICs Therefore, conventional emulation systems by offering fixed connections may require expensive hops from a source ASIC to a destination ASIC in some cases and may provide seldom used dedicated connections in other cases. As such, a significant improvement in the interconnectivity of various components of emulation is required.

SUMMARY

What is therefore desired are systems and methods for dynamic switching and routing in various interconnects (logic board-level and system-level) of the emulation system for a faster performance and a better utilization of connection resources.

Embodiments disclosed herein solve the aforementioned technical problems and may provide other technical benefits as well. More particularly, embodiments disclosed herein switching logic in board-level interconnects and in the system-level interconnects that may provide bit-level (also referred to as bitwise or single-bit or one-bit) dynamic routing and switching between corresponding board-level and system-level components. At board-level, a switching ASIC (also referred to as a switching chip) may receive input data through a backplane from an emulation ASIC in a first logic board and route any bit of the input data to any of the emulation ASICs in a second logic board. At system-level, a switching logic board containing a set of switching ASICs may be associated with a logic cluster and may dynamically route data bits from the emulation ASICs in the logic cluster to emulation ASICs to other logic clusters of the emulation system and/or target systems. Additionally, the switching logic board may dynamically route bits from the other logic clusters to the associated logic cluster.

In an embodiment, an emulation system for routing bitwise data during emulation comprises a first logic board containing a first set of emulation chips; a second logic board containing second set of emulation chips; and a switching chip configured to receive input data bits from a first emulation chip of the first set of emulation chips and route any input data bit of the input data bits to any emulation chip of the second set of emulation chips.

In another embodiment, an emulation system for routing bitwise data during emulation comprises a first logic board containing a first set of emulation chips, wherein the first logic board is in a first logic cluster of a first emulation rack; a second logic cluster containing a first set of logic boards, wherein the second logic cluster is in a second emulation rack; and a switching logic board containing a set of switching chips, wherein a first switching chip of the set of switching chips is configured to receive input data bits from a first emulation chip of the first set of emulation chips and route any input data bit of the input data bits to at least one emulation chip of any of the first set of logic boards.

In yet another embodiment, an emulation method for routing bitwise data during emulation comprises receiving, by a first switching chip of a set of switching chips in a switching logic board of an emulation system, input data bits from a first emulation chip of a first set of emulation chips in a first logic board in a first logic cluster of a first emulation rack; and routing, by the first switching chip, any input data bit of the input data bits to at least one emulation chip of any of a first set of logic boards in a second logic cluster in a second emulation rack.

BRIEF DESCRIPTION OF THE DRAWINGS

The accompanying drawings constitute a part of this specification and illustrate an embodiment of the subject matter described herein.

DETAILED DESCRIPTION

Embodiments disclosed herein describe switching logic at board-level and system-level interconnects in an emulation system. The switching logic may provide a dynamic bitwise switching between corresponding components in the emulation system. At the board-level, a switching ASIC may receive input bits from source emulation ASICs within a logic cluster, perform bitwise routing of the signals to generate output bits, and transmit the output bits to destination ASICs in a logic board of the logic cluster. The switching ASIC may have a connection to each of the emulation ASICs in the logic board. At the system-level, a switching logic board containing a set of switching ASICs may be associated with a logic cluster and may dynamically route data bits from the emulation ASICs in the logic cluster to emulation ASICs to other logic clusters of the emulation system and/or target systems. Additionally, the switching logic board may dynamically route bits from the other logic clusters to the associated logic cluster.

Figure 1:
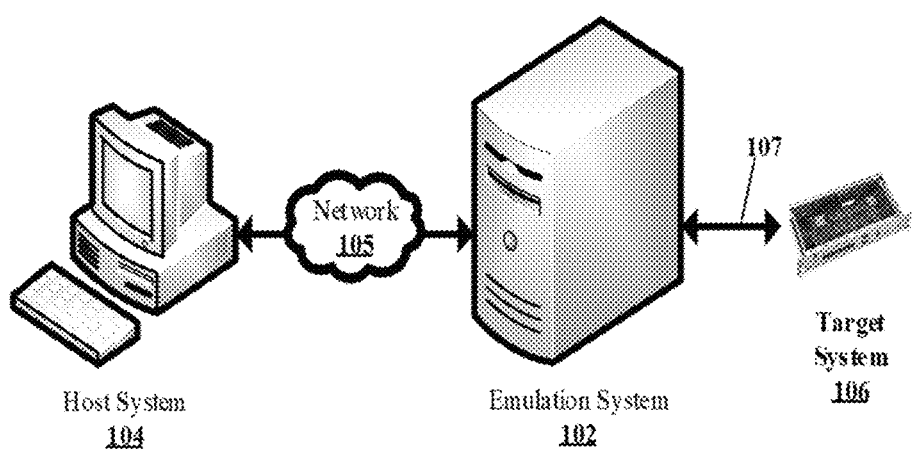
FIG. 1 shows an illustrative environment including an emulation system, according to an embodiment.

FIG. 1 shows an illustrative environment 100 of an emulation system including switching logic for board-level and system-level interconnects according to an embodiment. The illustrative environment 100 may comprise a host system 104, an emulation system 102, a target system 106, a network 105, and a connection 107. The host system 104 may include one or more workstations that may run debug and runtime software interacting with the emulation system 102. The workstations may be any type of computing devices such as desktop computers, laptop computers, tablet computers, and smartphones. The emulation system 102 may a combination of hardware and software modules which may emulate a design under test (DUT). As described below, the emulation system 102 may include clusters of interconnected ASICs, non-transitory memory devices, buffers, data storage devices configured to provide a system platform for emulating the DUT. The clusters may be arranged in multiple boards. The boards may be arranged within multiple racks. Multiple racks may be arranged in a plurality of emulation of devices, which may be analogous to multi-rack servers. The target system 106 may comprise hardware and/or software modules configured to interact with the DUT being emulated. For example, if the DUT is a design of a graphics processing unit (GPU), the target system 106 may be a motherboard configured to receive the GPU after fabrication. The target system 106 may be an external hardware environment provided by the user.

The network 105 may be any kind of communication link facilitating communication between the host system 104 and the emulation system 102. For example, the network 105 may include a local area network (LAN), metropolitan area network (MAN), wide area network (WAN), and/or the Internet. The connection 107 may be also be any kind of communication link configured to facilitate a communication with the emulation system 102 and the target system 106.

The above described systems 102, 104, 106 of the environment 100 are merely illustrative and other configuration should be considered to be within the scope of this disclosure. For example, the network 105 may include a local connection 107 or a combination of multiple local interconnects. In some embodiments, the systems 102, 104, 106 may be local and housed within the same building. In other embodiments, one or more of the systems 102, 104, 106 may be accessed remotely. For example, the host system 104 may remotely access the emulation system 102 through the network 104 using a remote access protocol such as internet protocol (IP).

Figure 2:
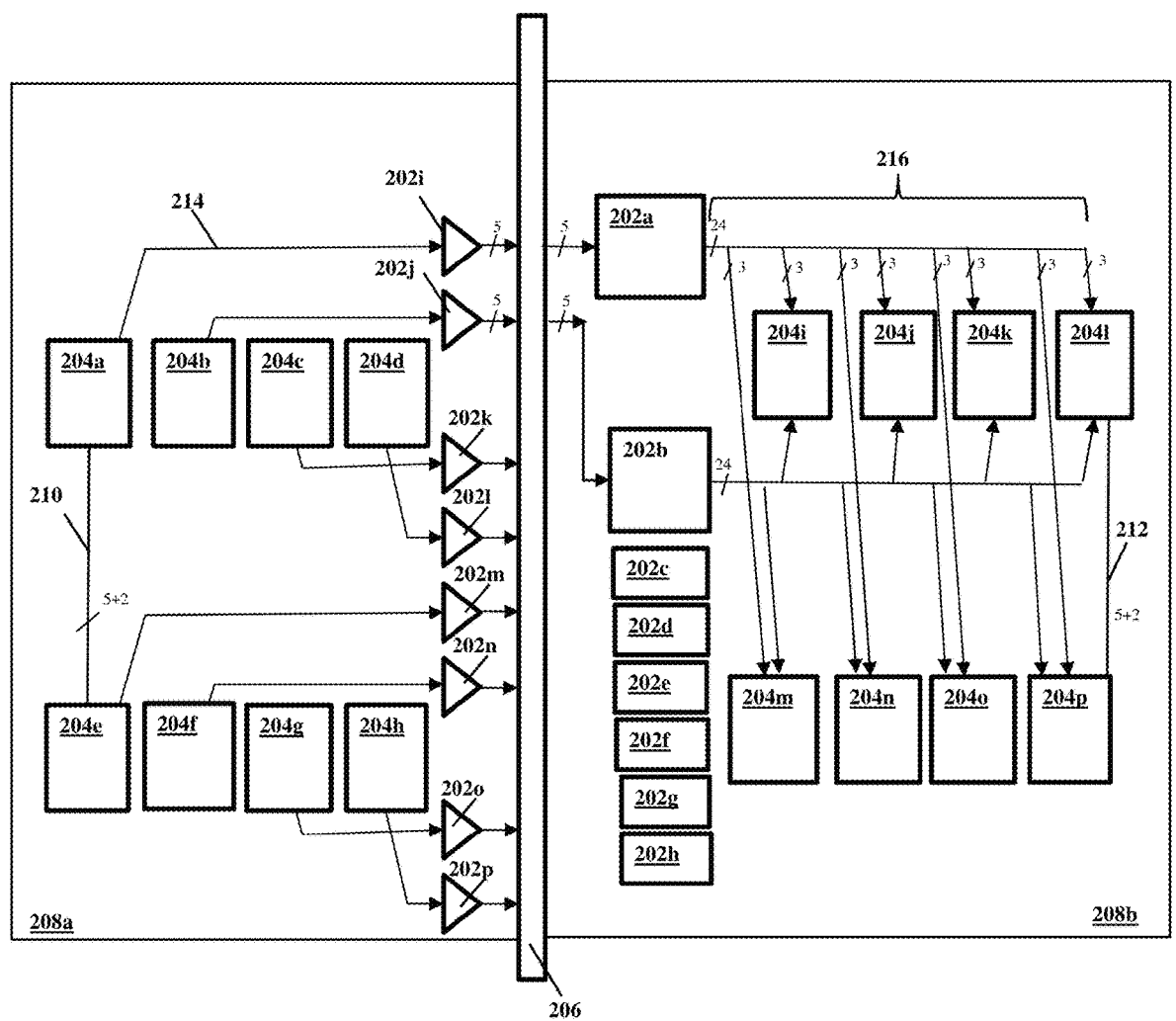
FIG. 2 shows an illustrative emulation circuit logic boards containing emulation ASICs, a backplane, and switching ASICs according to an embodiment.

FIG. 2 shows an illustrative emulation circuit 200 in an emulation system (e.g., emulation system 102 shown in FIG. 1). As shown, the emulation circuit 200 may include a plurality of emulation ASICs 204a-204p (collectively or commonly referred to as 204) and a plurality of switching ASICs 202a-202p (collectively or commonly referred to as 202. An emulation ASIC 204 may be any computational unit to perform logic computation for the purpose of emulation, simulation, and/or prototyping of logic systems and may include Boolean-processor-based-systems, field programmable gate arrays (FPGAs), or the like. A first set of emulation ASICs 204a-204h may be arranged within a first logic board (also referred to as logic drawer) 208a and a second set of emulation ASICs 204i-204p may be arranged within a second logic board 208b. The first logic board 208a and the second logic board 208b may be interconnected to each other through a backplane 206. The backplane 206 may provide connectors and/or slots to connect or dock the logic boards 208a, 208b.

The first set of emulation ASICs 204a-204h may be connected to each other through a plurality of on-board connections (an illustrative on-board connection 210 shown for reference) on the first logic board 208a. The on-board connections (also referred to as board-level interconnects) may be, for example, copper traces connecting the first set of emulation ASICs 204a-204h to each other. In an embodiment, each on-board connection between a pair of ASICs 204 may provide seven data lanes, five serializer-deserializer (SerDes) lanes and two low-latency lanes. For example, the on-board connection 210 between emulation ASICs 204*a*, 204*e* may include five SerDes lanes and two low-latency lanes connecting the emulation ASICs 204*a*, 204*e*. The five SerDes lanes of the on-board connection 210 may, in some instances, operate at six gigabits per second (Gbps). The two low-latency lanes of the on-board connection 210, in some instances, operate at two Gbps. Similarly, the second set of emulation ASICs 204*i*-204*p* may be connected to each other through a plurality of on-board connections (an illustrative on-board connection 212 is shown for reference). The on-board connection 212 in the second logic board 208*b* may be similar to the on-board connection 210 of the first logic board 208*a*.

The configuration of a pair of logic boards 208*a*, 208*b* connected through a backplane 206 is merely for illustration. Other logic boards (not shown) may be connected to the backplane 206. In an illustrative embodiment, six logic boards (including the logic boards 208*a*, 208*b*) may be connected through the backplane forming a logic cluster. Therefore, there may be forty eight emulation ASICs (including emulation ASICs 204) in one logic cluster.

Each emulation ASIC in each logic board may be connected at least one switching ASIC in other logic boards of the same logic cluster through the backplane 206. For example, the emulation ASIC 204*a* in the first logic board 208*a* may be connected to a switching ASIC 202 in the second logic board through the backplane 206. An interconnect 214 between the emulation ASIC 204*a* and the switching ASIC 202*a* may include five lanes to drive five signals into the backplane 206 and then to the switching ASIC 202*a*. In some embodiments, the emulation circuit 200 may be configured to utilize four lanes out of the five lanes in the interconnect 214. One of the five lanes in the interconnect 214 may be reserved to relocate a signal from a bad or faulty lane to the reserve lane. Such reservation may be applied to other interconnects through the backplane 206 in the emulation circuit 206. The interconnect 214, in some instances, may be formed by copper traces in the backplane 206, the first logic board 208*a*, and/or the second logic board 208*b*. A switching ASIC 202*i* connected to the emulation ASIC 204*a* may provide a pass-through passage to the signals driven by the emulation ASIC 204*a* through the interconnect 214 to the backplane 206. For instance, the switching ASIC 202*i* may have a pairs of pins (not shown): (i) input pins to receive signals from the interconnect 214 and (ii) output pins to drive the received signals into the backplane 206. The interconnect 214 may be connected to the switching ASIC 202*a* in the second logic board 208*b* through switching ASIC 202*i* on the first logic board 208*a* and the backplane 206.

Each switching ASIC in each logic board may receive signals through the backplane 206 from at least one emulation ASIC in other logic boards of the logic cluster and provide those signals to each emulation ASIC in the logic board. For example, the switching ASIC 202*a* may receive signals through the interconnect 214 from the emulation ASIC 204*a*. Continuing with the illustrative embodiment of a signal cluster with six logic boards, the switching ASIC 202 may receive signals through five-line interconnects from an emulation ASIC from other five logic boards connected to the backplane 206. Therefore, in addition to the five-lane interconnect 210, the switching ASIC 202*a* may have other four five-lane interconnects (not shown) for incoming signals from the respective emulation ASICs. Therefore, there may be twenty-five incoming lanes to the switching ASIC 202*a*.

The switching ASIC 202*a* may provide a single-bit dynamic multiplexing and routing of data coming from the incoming twenty five lanes and provide the multiplexed and routed data to the emulation ASICs 204*i*-204*p* through the interconnects 216. In some instances, the interconnects 216 may be formed by copper traces in the backplane 206 and/or the second logic board 208*b*. The single-bit dynamic multiplexing and routing functionality has been described in U.S. patent application Ser. No. 16/208,447, which is incorporated into this application by reference in its entirety. As shown, the switching ASIC 202*a* may have twenty four outgoing lanes in the interconnects 216, with three lanes to each of the emulation ASICs 204*i*-204*p*. Analogous to the switching ASIC 202*a*, another switching ASIC 202*b* may receive twenty five incoming signals through the backplane 206 from twenty five incoming lanes including five signals from an emulation ASIC 204*b*. After performing single-bit dynamic multiplexing and routing of the incoming data, the switching ASIC 202*b* may provide the routed and multiplexed to any of the emulation ASICs 204*i*-204*p* through twenty four outgoing lanes from the switching ASIC 202*b* with three lanes assigned to each of the emulation ASICs 204*i*-204*p*.

Each of the emulation ASICs 204*a*-204*h* in the first logic board 208*a* can transmit data to any of the emulation ASICs 204*i*-204*p* in the second logic board 208*b* by the use of the switching ASICs 202*a*-202*h*. The switching ASICs 202*a*-202*h* may route a single bit transmitted from any of the emulation ASICs 204*a*-204*h* in the first logic board to any of the emulation ASICs 204*i*-204*p* in the second logic board 208*b*. Therefore, within the cluster containing the logic boards 208*a*, 208*b*, the switching ASICs (including the switching ASICs 202*a*-202*h*) may route a single-bit from any emulation ASIC in any board to any emulation ASIC to any of the other boards. This flexibility is a significant improvement upon conventional systems using fixed and limited number of backplane connections.

Although FIG. 2 shows switching ASICs 202*a*-202*h* in the second logic board 208*b* and the switching ASICs 202*i*-202*p* are in the first logic board 206, one or more of the switching ASICs 202*a*-202*p* may be located within the backplane 206.

Figure 3:
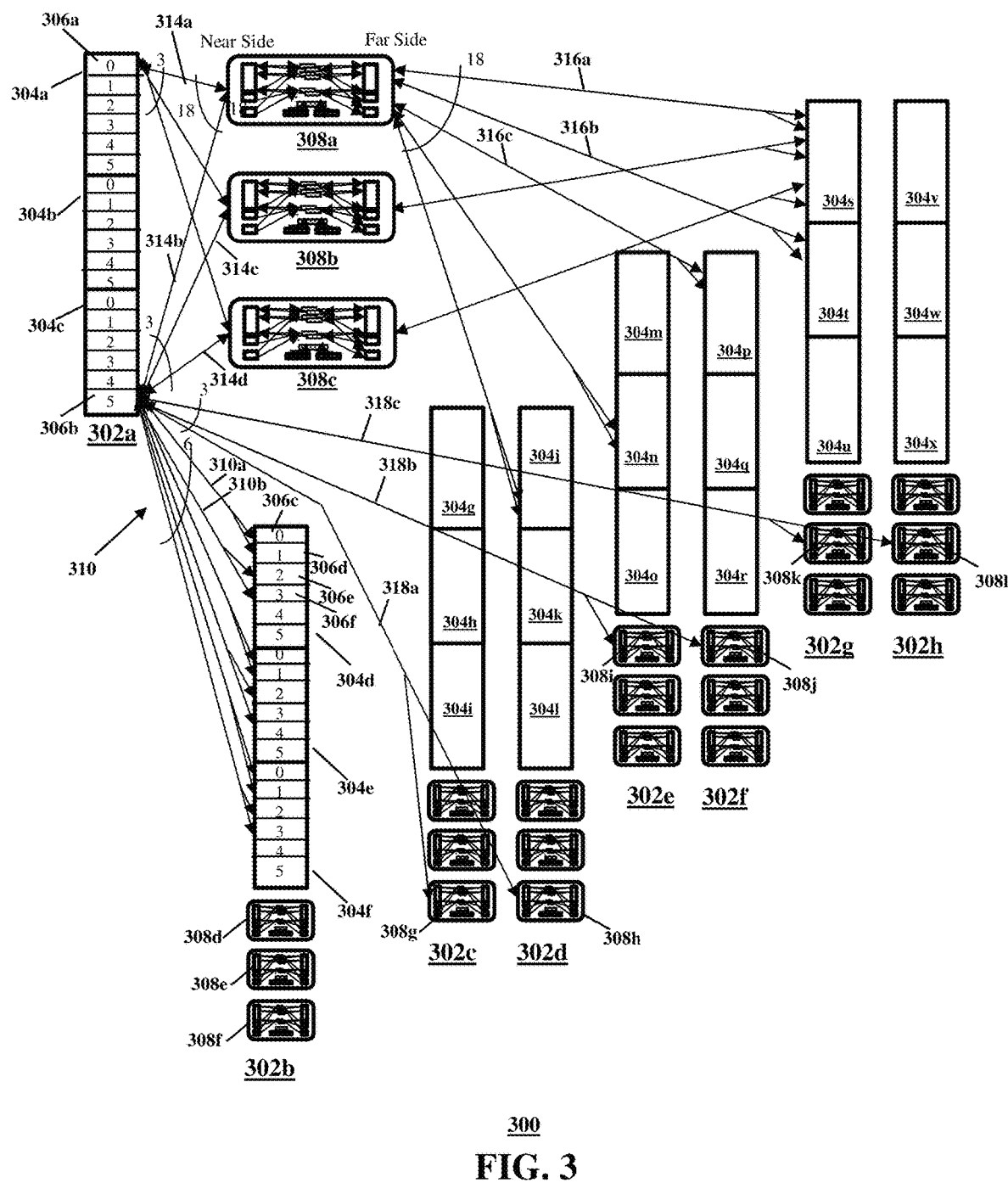
FIG. 3 shows illustrative rack-based emulation system and its system-level interconnects, according to an embodiment.

FIG. 3 shows an illustrative emulation system 300, according to an embodiment. The emulation system 300 may be a rack-based system containing emulation racks 302*a*, 302*b*, 302*c*, 302*d*, 302*e*, 302*f*, 302*g*, 302*h* (collectively and commonly referred to as 302). The emulation racks 302 may be paired together to form emulation rack-pairs. As shown, emulation four rack-pairs may be formed by pairing: (i) emulation racks 302*a*, 302*b*, (ii) emulation racks 302*c*, 302*d*, (iii) emulation racks 302*e*, 302*f*, and (iv) emulation racks 302*g*, 302*h*.

Each emulation rack 302 may contain multiple logic clusters. For example, emulation rack 302*a* may contain three logic clusters 304*a*, 304*b*, 304*c*. Across the emulation racks 302, there may be twenty four logic clusters 304*a*-304*x* (collectively or commonly referred to as 304). Each logic cluster 304 may include multiple logic boards connected to a common backplane. For example, logic cluster 304*a* may include six logic boards out of which a logic board 306*a* has been labeled for reference. As another example, logic cluster 304*c* in the emulation rack 302*a* may also include six logic boards out of which a logic board 306*b* has been labeled for reference. Furthermore, logic boards 306*c*-306*f* in the logic cluster 304*d* within the emulation rack 302*b* have also been labeled for reference. Examples of logic boards 306*a*-306*f* have been described in reference to FIG. 2.

Figure 4A:
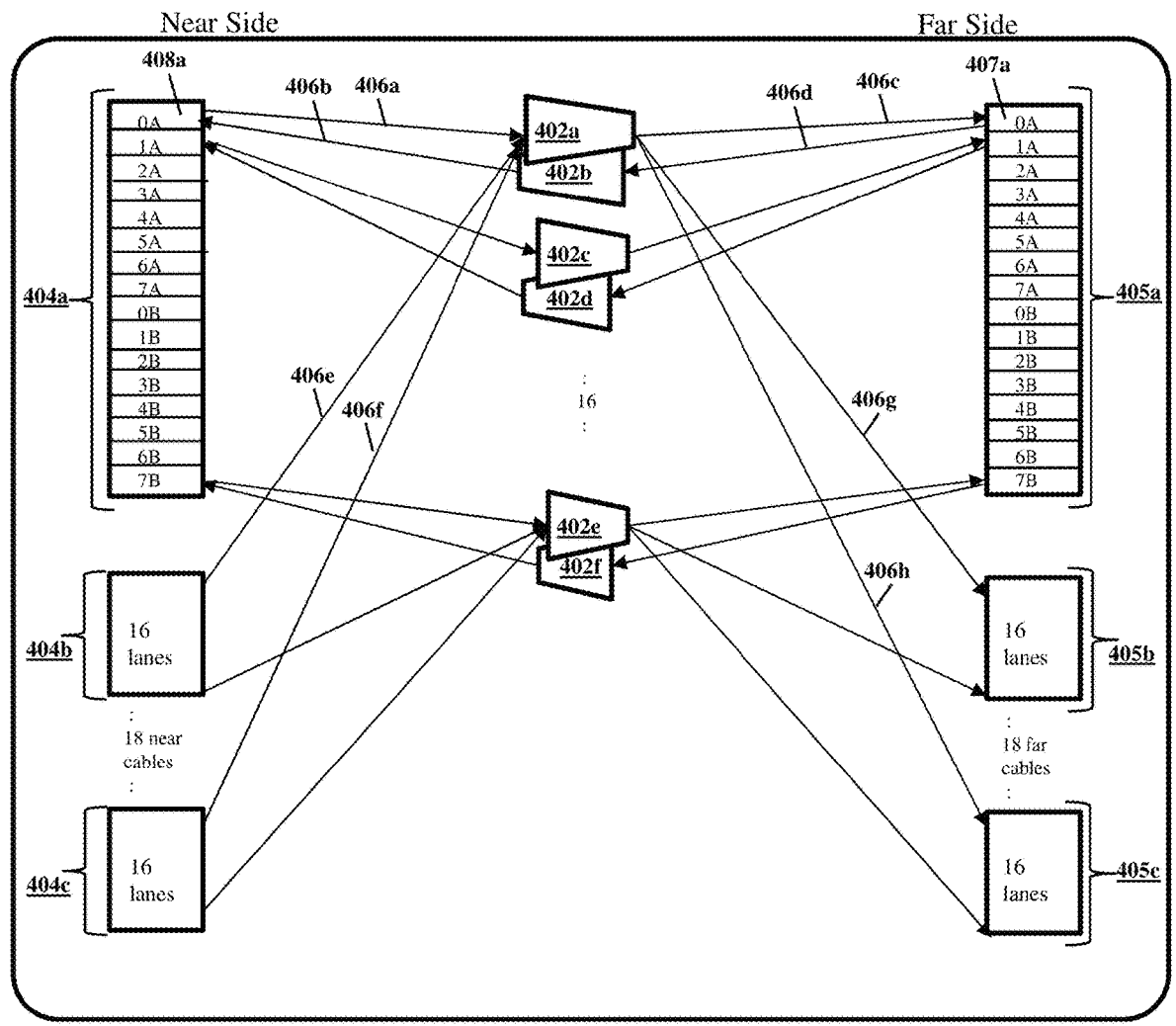
FIGS. 4A-4B show an illustrative system interconnect switch of an emulation system, according to an embodiment.

The emulation system 300 may include multiple system interconnect switches out of which system interconnect switches 308a-308l have been labeled for reference. Furthermore system interconnect switches 308a-308a may be commonly or collectively referred to as 308. A system interconnect switch 308 may include multiple emulation ASICs. Architectural details of the interconnect switches have been described in reference to FIGS. 4A-4B below. Each interconnect switch 308 may be associated with a logic cluster 306 and may be located in a system optics drawer (not shown) of the logic cluster 306. A system optic drawer may include routing and switching devices for transmitting outgoing data from the respective logic cluster 306 and receiving incoming data to the respective logic cluster 306. As shown herein, in the emulation rack 302a system interconnect switch 308a may be associated with the logic cluster 304a, system interconnect switch 308b may be associated with the logic cluster 304b, and system interconnect switch 308c may be associated with the logic cluster 304c. Similarly, in the emulation rack 302b, system interconnect switch 308d may be associated with the logic cluster 304d, system interconnect switch 308e may be associated with the logic cluster 304e, and the system interconnect switch 308f may be associated with logic cluster 304f.

Within each emulation rack, each emulation ASIC may be connected to two emulation ASICs on each logic board of other clusters. For example, in the emulation rack 302a, each emulation ASIC in the logic board 306b may in the logic cluster 304c may be connected to two emulation ASICs of in each of the twelve logic boards of the remaining clusters 304a, 304b, including logic board 306a. The connection may be through optical cables (not shown), which may also referred to as raceway cables.

There may also be direct connections between the emulation racks of an emulation rack-pair. The direct connections, in an embodiment, may be through optical cables referred herein as pair cables. For example, in the emulation rack-pair formed by emulation racks 302a, 302b, there may be six pair cables 310. The pair cables 310 may provide a communication lane from each emulation ASIC in the logic board 306b to one emulation ASIC in four logic boards for each of the clusters 304d, 304e, 304f of the emulation rack 302b. For example, each emulation ASIC in the logic board 306b may be directly connected through pair cables 310a, 310b (subset of pair cables 310) to one emulation ASIC in each of the logic boards 306c, 306d, 306e, 306f in the cluster 304d. A single pair cable may be used from one source to two targets due to a cross-over functionality of the pair cables. For example, a cross-over adapter may be used to split the pair cable 310a at close to the logic boards 306c, 306d such that a single pair cable 310a may be used to reach an emulation ASIC in each of the logic boards 306c, 306d. The cross-over functionality has been described in detail in reference to FIG. 5 below.

A system interconnect switch, for example system interconnect switch 308a may provide switching and routing functionality between non-paired emulation racks 302. More specifically, the system interconnect switch 308a may provide switching and routing functionality between the emulation ASICs of the emulation rack 302a with the emulation ASICs of server racks 302c-302h. The system interconnect switch 308a may have a near side, interfacing logic clusters 304a-304c and logic boards (e.g., logic boards 306a, 306b) of the emulation rack 302a. The near side of a system interconnect switch may be interfacing components of emulation rack that contains the system interconnect switch. The system interconnect switch 308a may have a far side interfacing each of the clusters 304g-304x of the emulation racks 302c-302h.

At the near side, the system interconnect switch 308a may have eighteen near cables (near cables 314a-314b labeled for reference). The near cables may be optical cables or any other type of wired communication medium. One near cable is provided to each logic board from the system interconnect switch 308a. As subset of the eighteen near cables at the near side of the system interconnect switch, a first near cable 314a coming from logic board 306a and a second near cable 314b coming from the logic board 306b are shown. Furthermore, each logic board in the emulation rack 302a may have three near cables for corresponding connections to the three system interconnect switches 308a-308c. For example, the logic board 306b may have: (i) near cable 314b to the system interconnect switch 308a, (ii) near cable 314c to system interconnect switch 308b, and (iii) near cable 314d to system interconnect switch 308c.

At the far side, the system interconnect switch 308a may have eighteen far cables (far cables 316a-316c labeled for reference). The far cables may be optical cables or any other type of wired communication medium. Each of the eighteen far cables are configured to connect the system interconnect switch 308a with respective logic clusters in the remaining emulation racks 302c-302g. For example, far cable 316a may connect the system interconnect switch 308a with the logic cluster 304s of the emulation rack 302g. As another example, far cable 316b may connect the system interconnect switch 308a with the logic cluster 304t of the of the emulation rack 302g. As yet another example, far cable 316c may connect the system interconnect switch 308a with the logic cluster 304p of the emulation rack 302f. A cross-over adapter may be used at the end of the far cables to connect to two logic boards in each cluster. For example, the far cable 316a may be split into two near the logic cluster 304s to connect the far cable 316a with two logic boards of the logic cluster.

In addition to connecting to near side interconnect switches (e.g., logic board 306b connected to system interconnect switches 308a, 308b, 308c), each logic board may connect on the far side to system interconnect switches on other emulation racks 302. For example, the logic board 306b may be connected to: (i) system interconnect switch 308g in the emulation rack 302c and system interconnect switch 308h in the emulation rack 302d using far cable 318a, (ii) system interconnect switch 308i in the emulation rack 302e and system interconnect switch 308j in the emulation rack 302f using far side cable 318b, and (iii) system interconnect switch 308k in the emulation rack 302g and system interconnect switch 308l in the emulation rack 302h using far side cable 318c. Each of the far cables may be split using a cross-switch adapter to reach the two logic boards in a cluster.

The eight-rack emulation system 300 and its corresponding components are merely for illustration and should not limit the scope of this disclosure. The emulation system 300 may be scaled up or down while retaining the emulation and switching functionality based upon the principles described herein.

FIG. 4 shows an illustrative system interconnect switch 400, according to an embodiment. The system interconnect switch 400 may be similar to a system interconnect switch (e.g., system interconnect switch 308a) shown in FIG. 3. In an illustrative embodiment, the system interconnect switch 400 may be located in a system optical drawer of an emulation rack within a rack-pair of a four rack-pair (or an eight rack) emulation system. However, the eight rack emulation system is merely for illustration, and the system interconnect switch 400 may be scaled up for a larger number of emulation racks and/or scaled down for a smaller number of emulation racks. For the switching functionality, the system interconnect switch 400 may include a plurality of switching ASICs 402a-402f (collectively and commonly referred to as 402).

The system interconnect switch 400 may receive eighteen near cables (e.g., near cables 404a, 404b, 404c, collectively or commonly referred to as 404) at its near side. The near cables 404 may be optical cables or any other type of wired communication media. The near cables 404 may connect the system interconnect switch 400 with each of eighteen logic boards in the emulation rack containing the system interconnect switch 400. The eighteen logic boards may be divided between three logic clusters with each logic cluster containing six logic boards. The system interconnect switch 400 may also receive eighteen far cables (e.g., far cables 405a, 405b, 405c, collectively or commonly referred to as 405) at its far side. The far cables 405 may be optical cables or any other type of wired communication media. The far cables 405 may connect the system interconnect switch with eighteen clusters of six emulation racks other than the rack-pairs that the system interconnect switch 400 is a part of.

Each of the eighteen near cables and the eighteen far cables may be broken into sixteen lanes in each direction. For example, a first portion 408a of the near cable 404a may be broken into lanes 406a, 406b. Similarly, a first portion 407a of the far cable 405a may be broken into lanes 406c, 406d. The lane 406a may transmit a signal from the first portion 408a of the near cable 404a into a switching ASIC 402a through the lane 406a. Furthermore, the lane 406b may transmit a signal from a switching ASIC 402b to the first portion 408a of the near cable 404a. At the far side, the lane 406d may transmit a signal from the first portion 407a of the far cable 405a to the switching ASIC 402b. The lane 406c may transmit a signal from from the switching ASIC 402a to the first portion 407a of the far cable 405a. For each of the portions (e.g., a first portion 408a of the near cable 404a and the first portion 407a of the far cable 405a), there may be two switching ASICs 402a, 402b to switch and route the signals for each direction. As shown, the switching ASIC 402a may switch and route signals from the near side side to the far side of the system interconnect switch 400 and the switching ASIC 402b may switch and route signals from the far side to the near side of the system interconnect switch 400.

The first portion 408a of the near cable 404a may refer to a lane of the near cable 404a. The definition of lanes may not be necessarily confined to the lanes 406 between respective cables 404, 405 and the corresponding switching ASICs 402. For example, the first portion 408a of the near cable 404a may be referred to as a first lane of the near cable 404a. As shown, each cable 404, 405 is broken into sixteen lanes. For instance, the near cable 404a is broken into lanes 0A (408a), 1A, 2A, 3A, 4A, 5A, 6A, 7A, 0B, 1B, 2B, 3B, 4B, 5B, 6B, 7B. As the near cable connects the system interconnect switch 400 with a logic board containing eight emulation ASICs (numbered from 0 to 7), the near cable may provide two data lanes between each emulation ASIC in the logic board and the system interconnect switch 400. For example, lanes 0A and 0B may be associated with emulation ASIC 0 in the logic board and lanes 5A and 5B may be associated with emulation ASIC 5 in the logic board.

Continuing with the illustrative embodiment of eight rack (four rack-pair) emulation system, the system interconnect switch 400 may include thirty two switching ASICs 402 for switching and routing signals between the near cables 404 and the far cables 405. A first set of sixteen switching ASICs 402 (e.g., 402a) may switch and route signals from the near side to the far side. A second set of sixteen switching ASICs (e.g., 402b) may switch and route signals from the far side to the near side. Each of the switching ASICs 402 switching and routing signals from the near side to the far side may have eighteen incoming data lanes (e.g., incoming data lanes 406a, 406e, 406f to switching ASIC 402a) to carry data from the near cables 404 to the corresponding switching ASICs 402 and eighteen outgoing data lanes (e.g., outgoing data lane 406c, 406g, 406h from switching ASIC 402a).

Figure 4B:
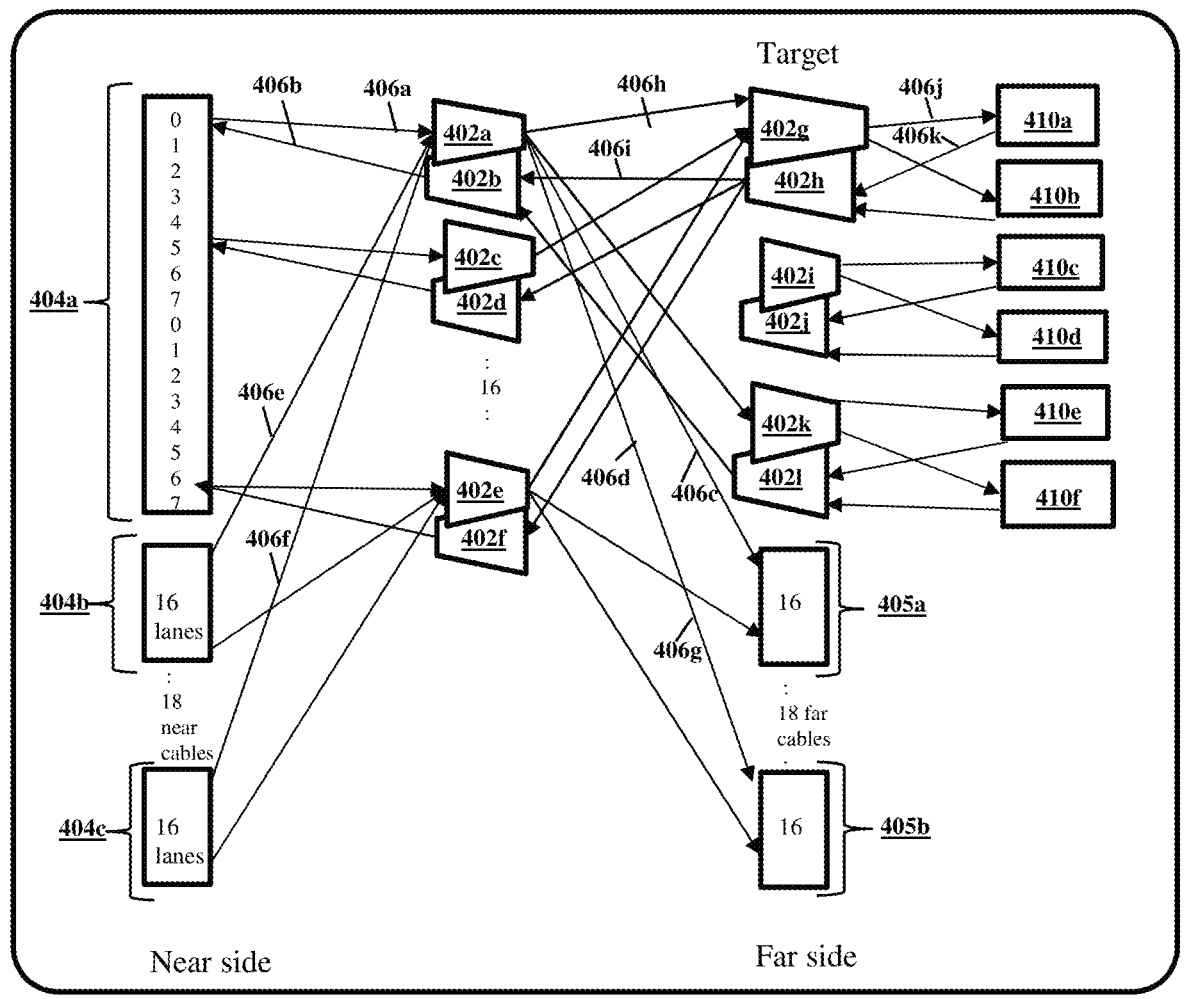

In addition to providing routing and switching functionality between near cables 404 and far cables 405, the system interconnect switch 400 may provide a routing and switching functionality between emulation ASICs in the logic boards in the near side with target systems. FIG. 4B shows the interconnect switch 400 with additional components for switching and routing data between the near cables 404 and a plurality of target cables 410a-410f (commonly or collectively referred to as 410. To that end, each of the switching ASICs 402 switching and routing data from the near side to the far side (e.g., switching ASICs 402a, 402c, 402e) may be connected to a target switching ASICs 402 (e.g., switching ASICs 402g, 402i, 402k) switching and routing data from the system interconnect switch 400 to the target cables 410. For example, a data lane 406h may carry data from the switching ASIC 402a to the target switching ASIC 402g. At the other direction, data lane 406i may carry data from the target switching ASIC 402h to the switching ASIC 402b. Therefore, each target switching ASIC 402 transmitting data from the near side to the target cables 410 may therefore receive sixteen data lanes. At the other direction, each target switching ASIC 402 transmitting data from the target cables 410 the near side of the system interconnect switch 400 may have sixteen outgoing data lanes to the switching ASICs 402 (e.g., 402b, 402d, 402f). In some embodiments, there may be two data lanes between each switching ASIC 402 and target switching ASIC 402 in each direction. In these embodiment, the target switching ASIC 402g may have thirty two incoming lanes from the switching ASICs 402 and the target switching ASIC 402h may have thirty two outgoing lanes to the switching ASICs 402.

There may be data lanes to carry signals between the target switching ASICs 402 and the target cables 410. For example, data lane 406j may transmit data from the target switching ASIC 402g to the target cable 410a and the data lane 406k may transmit data from the target cable 410a to the target switching ASIC 402h.

Figure 5:
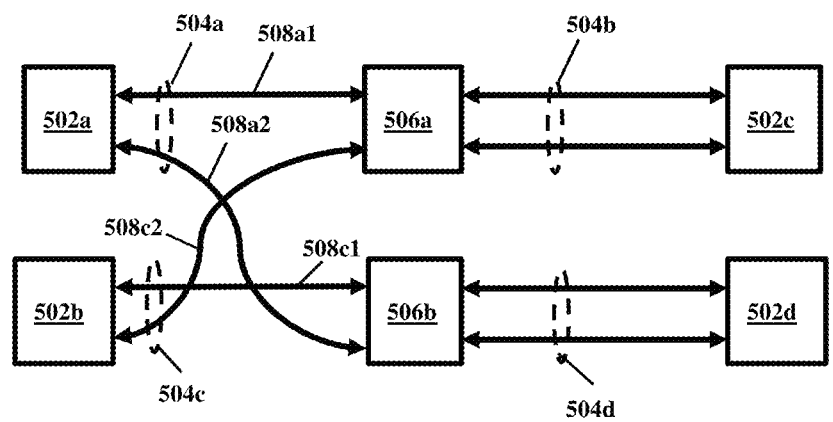
FIG. 5 shows illustrative cross-over connections in an emulation system, according to an embodiment.

FIG. 5 shows an illustrative emulation circuit 500 with a plurality of logic boards 502a-502d (collectively and commonly referred to as 502), bulkheads 506a, 506b (collectively and commonly referred to as 506), and system interconnect cables 504a-504d (collectively and commonly referred to as 504). In an embodiment, system interconnect cables 504a, 504c may form a crossover adapter. The crossover adapter may connect signals 508a1 originating from logic board 502a to bulkhead 506a. Furthermore, the crossover adapter may connect signals 508a2 also originating from logic board 502a to bulkhead 506b. Without the crossover adapter, signals 508a2 would have been originally connected to system interconnect cable 504b in the bulkhead 506a. Similarly, this crossover adapter may connect signals 508c1 to bulkhead 506b and signals 508c2 to bulkhead 506a. As noted in FIG. 3 above, the crossover adapter may allow signals from the logic board 502a to each of the logic drawers 502c, 502d, splitting the system interconnect 504a to allow connections to the logic boards 502c, 502d. Although this description details the destination of signals 508a1, 508a2 as being logic boards 502c, 502d, this is merely illustrative and other destinations should be considered within the scope of this disclosure. As an alternate to being logic boards 502c, 502d (e.g., logic board 306c in FIG. 3), the destinations may be interconnect switches (e.g., system interconnect switch 308a in FIG. 3). In an embodiment, the system interconnect cables 504 may be pair cables interconnecting logic boards 502 or interconnect switches in emulation racks of a rack pair. In another embodiment, the system interconnect cables 504 may be far cables interconnecting logic boards 502 or interconnect switches in emulation racks of non-rack pairs (e.g., a far side emulation rack).

Figure 6A:
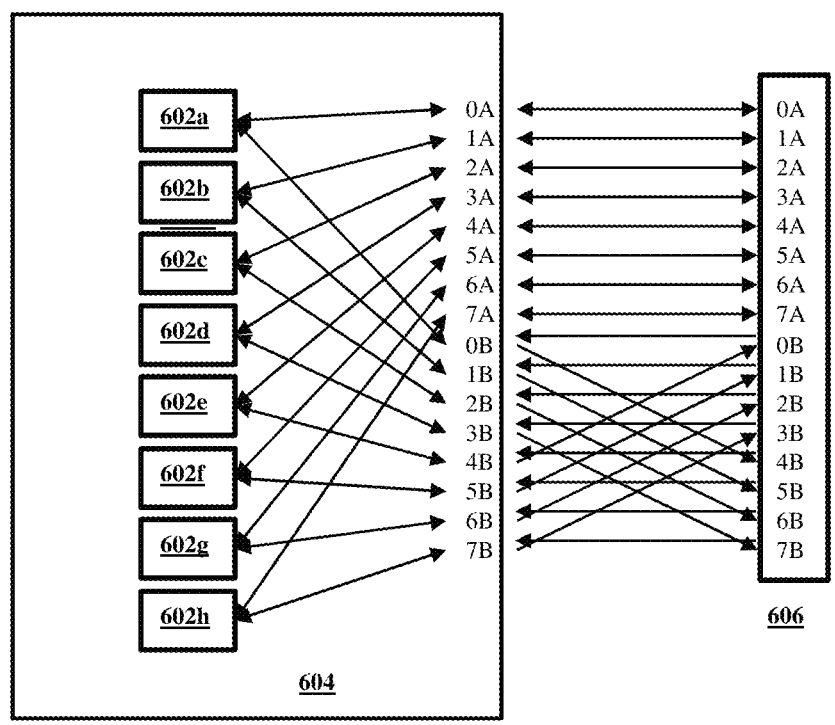
FIGS. 6A-6C show an illustrative twisted connections in an emulation system, according to an embodiment.

FIG. 6A shows a connection between a logic board 604 and a cable 604 to expand the connectivity between emulation ASICs 602a-602h of the logic board 604 with emulation ASICs of other logic boards within an emulation system. A connector (not shown) interconnecting the logic board 604 with the cable 606 may have A-side connections, shown as 0A-7A and B-side connections, shown as 0B-7B. Each connection may have an output half and an input half as shown by bidirectional arrows between 0A in the logic board 604 and 0A in the cable 604. The output half of the B-side connections may be twisted such that there are the following outgoing connections from the logic board 604 to the cable 606: (i) 0B→4B, (ii) 1B→5B, (iii) 2B→6B, (iv) 3B→7B, (v) 4B→0B, (vi) 5B→1B, (vii) 6B→2B, and (iii) 7B→3B. Therefore, using these additional connections, emulation ASIC 602a (ASIC_0 of the logic board 604), for example, may be connected to ASIC_0 and ASIC_4 of the logic board at the other end of the cable 606. As another example, emulation ASIC 602b (ASIC_1 of the logic board 604) may be directly connected to emulation ASIC_1 and ASIC_5 of the logic board at the other end of the cable 606.

Figure 6B:
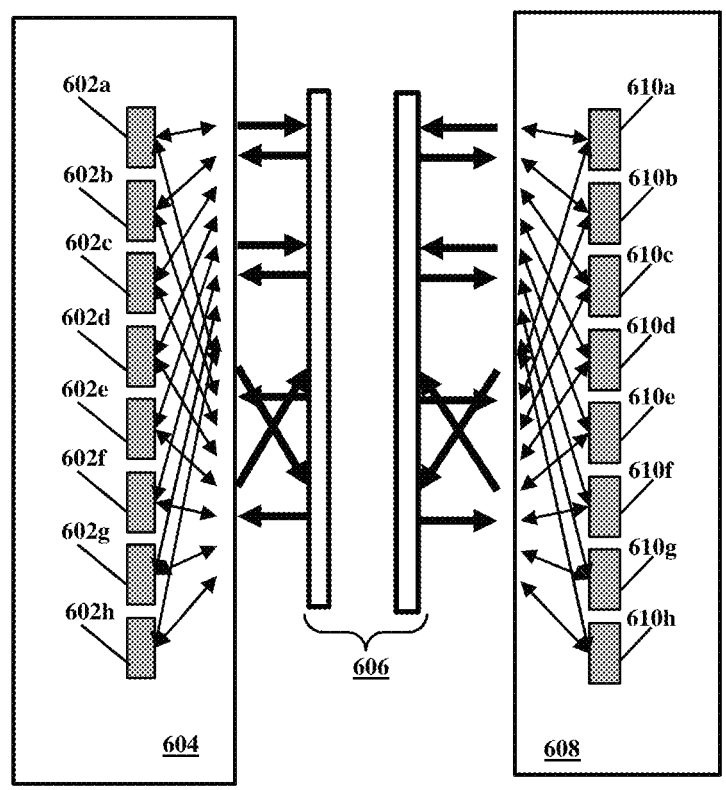

FIG. 6B shows a direct connection (e.g., without a system interconnect switch) between logic boards 604, 608 through a cable 606, according to an embodiment. Based on the principles described in regard to FIG. 6A, there may be other connection to the one-to-one connection between emulation ASIC (i) of logic board 604 with emulation ASIC (i) of the logic board 608 (e.g., 602a↔610a). The full range of connection due to the twisting of the B-side connections may therefore be: (i) 602a↔{610a, 610e}; (ii) 602b↔{610b, 610f}; (iii) 602c↔{610c, 610g}; (iv) 602d↔{610d, 610h}; (v) 602e↔{610e, 610a}; (vi) 602f↔{610f, 610b}; (vi) 602g↔{610g, 610c}; and (viii) 602h↔{610h, 610d}.

Figure 6C:
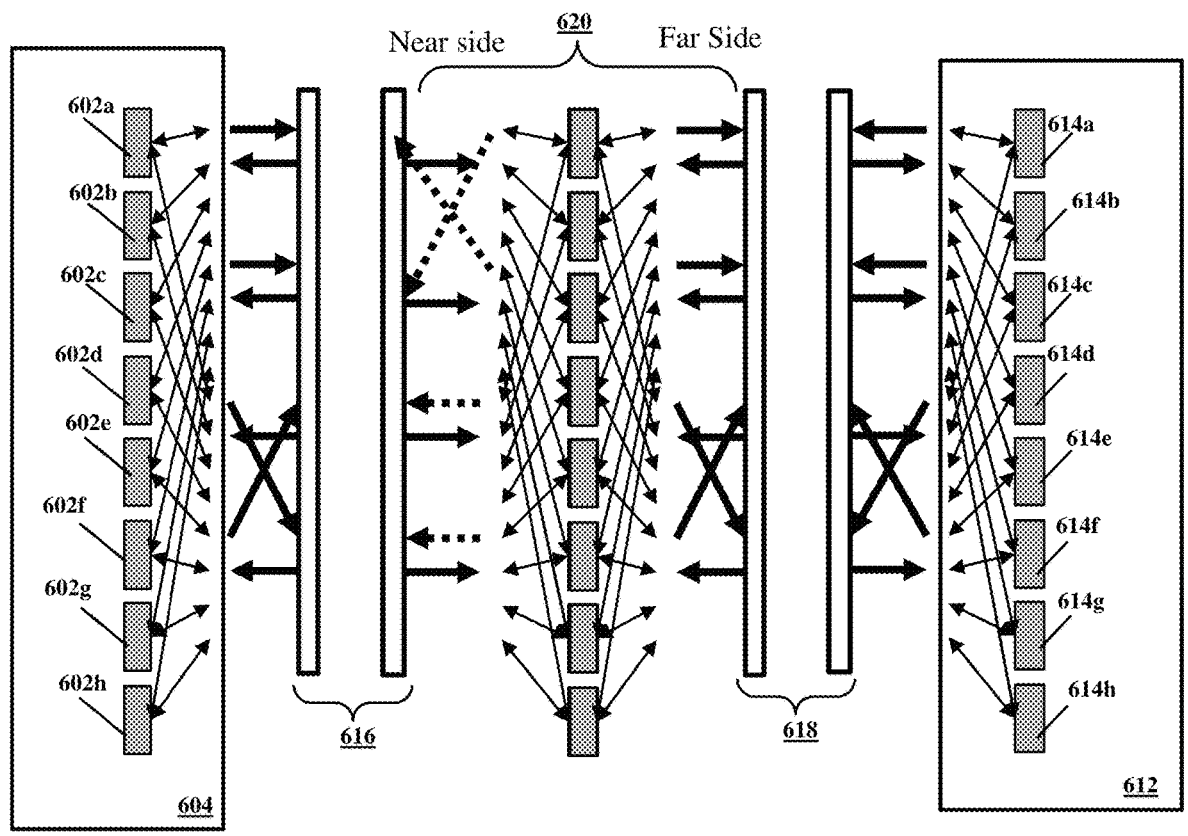

FIG. 6C shows a connection through a system interconnect switch 620 (similar to interconnect switch 400 shown in FIGS. 4A-4B) between logic boards 608, 612. From the perspective of the logic board 608, a near cable 616 interconnects the logic board 608 and the system interconnect switch 620. From the perspective of the logic board 612, a near cable 618 interconnects the logic board 612 with the system interconnect switch 620. Furthermore, the near side and far side of the system interconnect switch 620 as shown is from the perspective of the logic board 604. As shown, the B-side connections of the far side of the system interconnect switch 620 have been twisted, similar to the twists shown in FIG. 6A. B-side connections between: (i) the logic board 604 and cable 616, (ii) the far side of the system interconnect switch 620 and the cable 618, and (iii) cable 616 and logic board 612 may be twisted according to the principles described in FIG. 6A to achieve a range of connections between the emulation ASICs 602a-602f in the logic board 604 and emulation ASICs 614a-614f analogous to the connections described in FIG. 6B. More particularly, the connections between the emulation ASICs 602a-602f and 614a-614f may be: (i) 602a↔{614a, 614e}; (ii) 602b↔{614b, 614f}; (iii) 602c↔{614c, 614g}; (iv) 602d↔{614d, 614h}; (v) 602e↔{614e, 614a}; (vi) 602f↔{614f, 614b}; (vi) 602g↔{614g, 614c}; and (viii) 602h↔{614h, 614d}.

Figure 7:
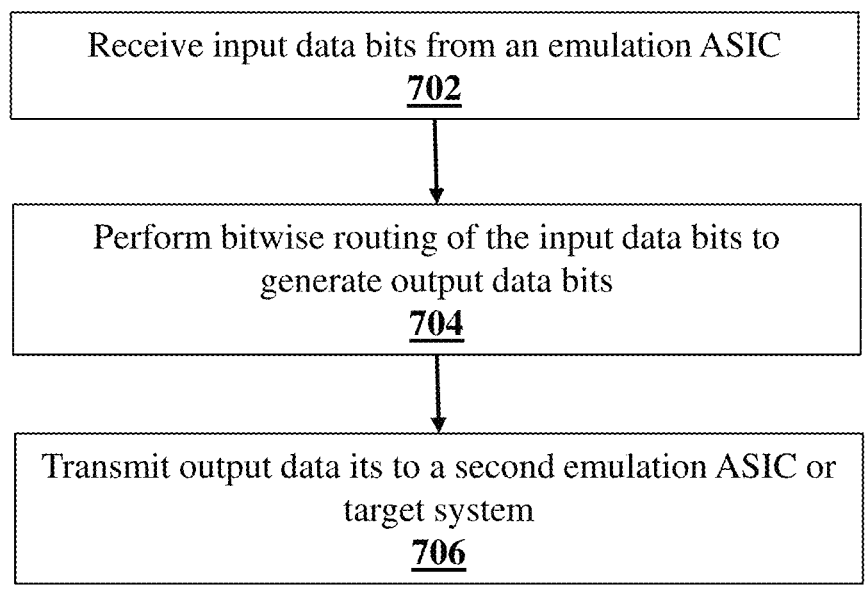
FIG. 7 shows a flow diagram of an illustrative method of dynamic bitwise routing in an emulation system, according to an embodiment.

FIG. 7 shows a flow diagram of an illustrative method 700 of dynamic bitwise routing of data between portions of an emulation system, according to one embodiment. The steps described herein are merely illustrative and additional or substitute steps should also be considered to be within the scope of this disclosure. Furthermore, methods with a fewer numbers of steps should also be considered to be within the scope of this disclosure. Although various portions of a switching logic board may perform different steps of the method 700, the following description details the switching logic board performing the different steps of the method 700.

The method 700 may begin at step 702, wherein the switching logic board may receive input data bits from an emulation ASIC. The emulation ASIC may be in a logic board of a logic cluster within an emulation rack. At step 704, the switching logic board may perform bitwise routing of the input data bits to generate output data bits. The bitwise routing may be performed by a set of switching ASICs in the switching logic board. For example, a switching ASIC may deserialize the input data bits to provide parallel bits to a switching matrix in the switching ASIC. The switching matrix may route the parallel bits and the switching ASIC may serialize the routed parallel bits to generate the output data bits. At step 706, the switching logic board may transmit the output data bits to a second emulation ASIC or a target system. The second emulation ASIC may be in a second logic board of a second logic cluster with a second emulation rack of the emulation system.

Therefore, using the illustrative method 700, a data bit from any emulation ASIC within a first emulation rack may reach at least a second emulation ASIC within a second emulation rack just by hopping through switching ASICs and without hopping through emulation ASICs. Hopping through the switching ASICs may provide dynamic non-dedicated connections between the emulation ASICs and mitigate the inefficiencies of hopping through the emulation ASICs.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An emulation system for routing bitwise data during emulation, the emulation system comprising:
   a first logic board containing a first set of emulation chips;
   a second logic board containing a second set of emulation chips;
   a switching chip including a switching matrix configured to receive input data bits from a first emulation chip of the first set of emulation chips, deserialize the input data bits, route any of the deserialized input data bits to any emulation chip of the second set of emulation chips, and serialize the routed input data bits, the route excluding all emulation chips between the first emulation chip and any of the second set of emulation chips; and
   a plurality of interconnects, each interconnect including a plurality of lanes and a reserve lane configured to relocate a signal from one of the plurality of lanes,
   the switching chip operatively coupled with each of the first set of emulation chips by a first plurality of lanes and reserve lanes of a first subset of the plurality of interconnects and with each of the second set of emulation chips by a second plurality of lanes and reserve lanes of a second subset of the plurality of interconnects.

2. The emulation system of claim 1, wherein the first and the second logic boards are connected to a backplane operatively coupled with one or more of the plurality of interconnects.

3. The emulation system of claim 1, wherein the switching chip is connected to the first emulation chip through the lanes and the reserve lane of one of the plurality of interconnects.

4. The emulation system of claim 3, wherein the reserved lane is reserved to relocate data from bad data connection lanes.

5. The emulation system of claim 1, further comprising:
   a second switching chip configured to operate in a pass through mode to receive and buffer the input data bits in between the first emulation chip and the switching chip.

6. The emulation system of claim 1, wherein the first set of emulation chips are interconnected using corresponding sets of serializer-deserializer lanes.

7. The emulation system of claim 1, wherein the first set of emulation chips are interconnected using corresponding sets of low-latency lanes.

8. An emulation system for routing bitwise data during emulation, the emulation system comprising:
   a first logic board containing a first set of emulation chips, wherein the first logic board is in a first logic cluster of a first emulation rack;

a second logic cluster containing a first set of logic boards, wherein the second logic cluster is in a second emulation rack;

a switching logic board containing a set of switching chips, wherein a first switching chip of the set of switching chips is configured to receive input data bits from a first emulation chip of the first set of emulation chips, deserialize the input data bits route any of the input data bits to at least one emulation chip of any of the first set of logic boards, and serialize the routed input data bits, the route excluding all emulation chips between the first emulation chip and any of the second set of emulation chips; and a plurality of interconnects each including a plurality of lanes and a reserve lane configured to relocate a signal from one of the plurality of lanes, the switching chip operatively coupled with each of the first set of emulation chips by a first plurality of lanes and reserve lanes of a first subset of the plurality of interconnects and with each of the first set of logic boards by a second plurality of lanes and reserve lanes of a second subset of the plurality of interconnects.

9. The emulation system of claim 8, wherein the first logic board is connected to the switching logic board through a near cable.

10. The emulation system of claim 8, wherein the first logic board is connected to the switching logic board through a far cable.

11. The emulation system of claim 10, wherein the far cable includes a cross-over connection configured to connect with a second switching logic board in a rack-pair containing the switching logic board.

12. The emulation system of claim 8, wherein the first logic board is connected to a second logic board of a third emulation rack in a rack-pair containing the first and third emulation racks through a pair cable.

13. The emulation system of claim 12, wherein the pair cable includes a cross-over connection to a third logic board of the third emulation rack.

14. The emulation system of claim 12, wherein the pair cable includes at least one twisted connection to enable the first emulation chip in the first logic board to connect to at least two emulation chips in the second logic board.

15. The emulation system of claim 8, wherein at least one of a first cable interconnecting the first logic board with the switching logic board and a second cable interconnecting the switching logic board to the second logic cluster is an optical cable.

16. The emulation system of claim 8, wherein at least one of a first cable interconnecting the first logic board with the switching logic board and a second cable interconnecting the switching logic board to the second logic cluster contains one or more of the plurality of lanes.

17. The emulation system of claim 8, wherein the switching logic board, a first cable interconnecting the first logic board with the switching logic board, and a second cable interconnecting the switching logic board to the second logic cluster include at least one twisted connection configured to enable the first emulation chip in the first logic board to connect to at least two emulation chips in the second logic cluster.

18. The emulation system of claim 8, wherein the switching logic board is further configured to route the input data bits to a target system.

19. The emulation system of claim 8, wherein a first subset of the set of switching chips is configured to transmit data bits from the first logic board to the first logic cluster and a second subset of switching chips is configured to transmit data bits from the first logic cluster to the first logic board.

* * * * *